United States Patent [19]

Gellert

[11] Patent Number: 5,443,381
[45] Date of Patent: Aug. 22, 1995

[54] INJECTION MOLDING ONE-PIECE INSERT HAVING COOLING CHAMBER WITH RADIAL RIB PORTIONS

[76] Inventor: Jobst U. Gellert, 7A Prince St., Georgetown, Ontario, Canada, L7G 2X1

[21] Appl. No.: 276,623

[22] Filed: Jul. 18, 1994

[51] Int. Cl.⁶ ............................................. B29C 45/23
[52] U.S. Cl. ............................... 425/549; 261/328.15; 425/532; 425/564
[58] Field of Search ............... 425/549, 552, 562, 564; 264/328.15

[56] References Cited

U.S. PATENT DOCUMENTS 4,622,001  11/1986  Bright et al. ................... 425/549
4,687,613  8/1987  Tsutsumi ....................... 425/549

FOREIGN PATENT DOCUMENTS 1314370  3/1993  Canada .

*Primary Examiner*—Tim Heitbrink
*Attorney, Agent, or Firm*—Dalesman & Company

[57] ABSTRACT

An injection molding one-piece gate and cavity insert to be mounted between a heated nozzle and a cavity. The insert has a cooling fluid chamber extending around the central gate with a thin cavity wall portion extending between the cooling fluid chamber and a convex portion of the cavity. Alternating frontwardly and rearwardly projecting rib portions extend radially into the cooling fluid chamber to form a pair of tortuous passages between them for cooling fluid flowing each way around the insert from an inlet to an outlet. In addition to providing more cooling because of turbulent flow of the cooling fluid and their increased surface area, these rib portions also substantially increase the strength of the insert to withstand repetitive injection pressure in the cavity.

5 Claims, 3 Drawing Sheets

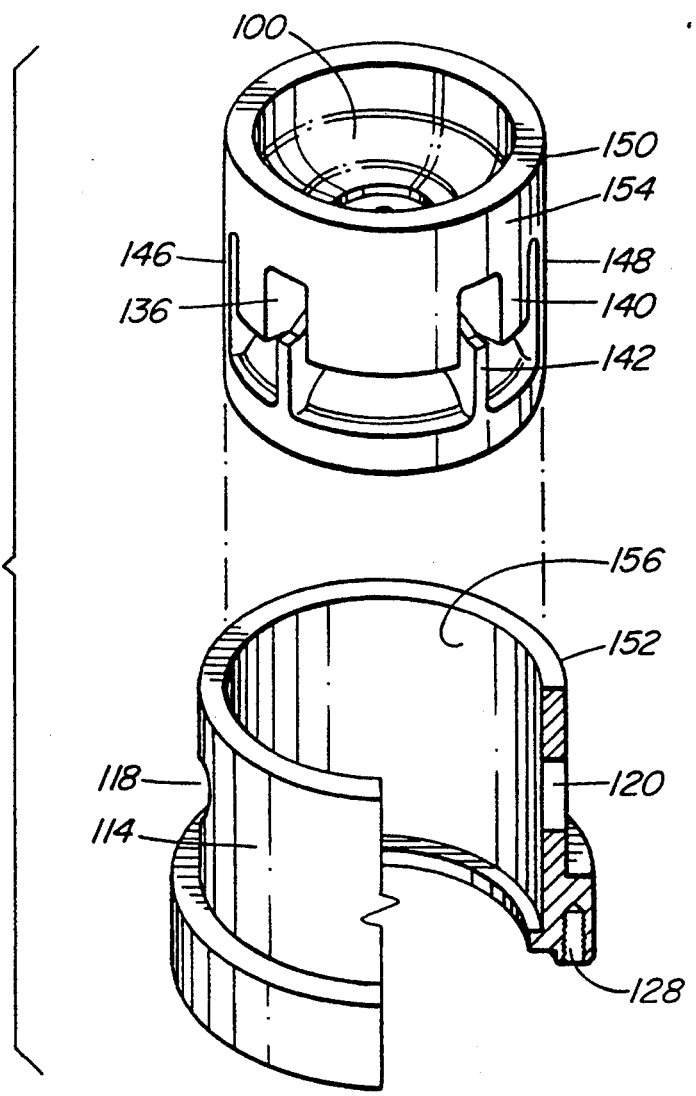
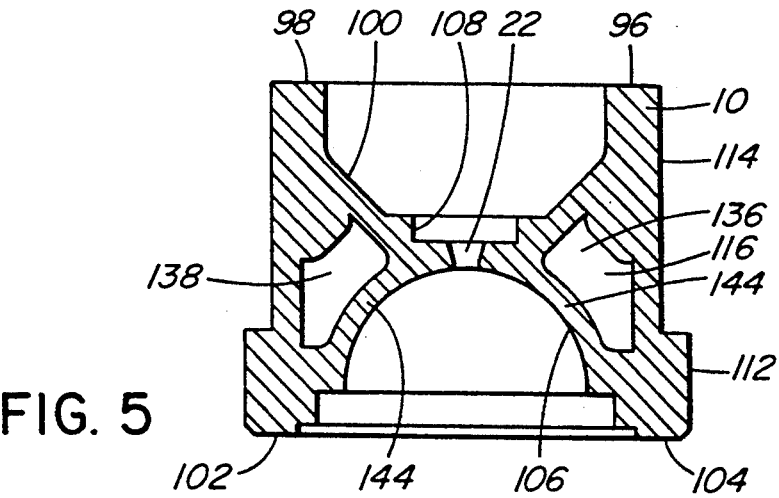

INJECTION MOLDING ONE-PIECE INSERT HAVING COOLING CHAMBER WITH RADIAL RIB PORTIONS

BACKGROUND OF THE INVENTION

This invention relates generally to injection molding cooled gate and cavity inserts and more particularly to such an insert with rib portions projecting into the cooling fluid chamber to improve the combination of cooling of the melt and structural strength of the insert.

Inserts which define a portion of the cavity and through which the gate extends to convey melt from a heated nozzle to the cavity are well known. Such inserts having a circular chamber for cooling fluid flowing around the gate are also known. U.S. Pat. No. 4,622,001 to Bright et al. which issued Nov. 11, 1986 shows a two-piece insert with a cooling chamber which is prone to leakage. U.S. Pat. No. 4,687,613 to Tsutsumi which issued Aug. 18, 1987 apparently illustrates a one-piece insert with a circular cooling chamber, but no way of making it is described. The applicants' Canadian Patent Number 1,314,370 which issued Mar. 16, 1993 shows a one-piece gate and cavity insert with a circular cooling chamber and also describes how to make it.

In most injection molding applications, the cost effectiveness of multi-cavity molding has made compact size a very important factor. While rapid cooling of the melt is important to reduce cycle time, higher injection pressures in the cavity have also made structural strength of the mold an increasingly important consideration. This is particularly true for molding polyethylene terephthalite (PET) preforms for beverage bottles which require large multi-cavity systems with short cycle times to be competitive. Of course, cooled gate and cavity inserts have the problem that increasing the size of the cooling fluid chamber to provide more cooling results in a loss of structural strength to withstand the injection and sealing pressure in the cavity. Furthermore, the thicker the cavity wall around the gate, the more insulation it provides and thus the more cooling that must be provided by the cooling fluid. Thus, all of the previous gate and cavity inserts have the disadvantage that the combination of melt cooling and structural strength they provide is insufficient for some applications such as molding PET bottle preforms.

SUMMARY OF THE INVENTION

Accordingly, it is an object of the present invention to at least partially overcome the disadvantages of the prior art by providing a cooled gate and cavity insert having rib portions extending into the cooling chamber to provide an improved combination of melt cooling and structural strength.

To this end, in one of its aspects, the invention provides an injection molding one-piece gate and cavity insert to be mounted in a mold between a heated nozzle and the cavity, the gate and cavity insert having a rear surface with a recessed portion, a front surface which partially forms a cavity, and a gate extending centrally therethrough from the rear surface to the front surface to convey melt from the nozzle to the cavity, the gate and cavity insert having an outer surface, a cooling fluid inlet, a cooling fluid outlet, and a circular cooling fluid chamber, the outer surface of the gate and cavity insert having a generally cylindrical portion with the cooling fluid inlet and the cooling fluid outlet extending inwardly therefrom opposite to each other, the generally circular cooling fluid chamber extending in the gate and cavity insert to convey cooling fluid from the cooling fluid inlet both ways around the gate to the cooling fluid outlet, the improvement wherein the front surface of the gate and cavity insert has a recessed portion to partially form a convex portion of the cavity, the gate and cavity insert having a cavity wall portion with a predetermined thickness extending between the cooling fluid chamber and the cavity, the gate and cavity insert having a plurality of first radially extending rib portions projecting frontwardly into the cooling fluid chamber, and a plurality of second radially extending rib portions projecting rearwardly from the cavity wall portion into the cooling fluid chamber, the first frontwardly extending rib portions alternating with and being sufficiently spaced from the second rearwardly extending rib portions to provide a pair of tortuous passages through the cooling fluid chamber for the cooling fluid flowing from the cooling fluid inlet to the cooling fluid outlet.

Further objects and advantages of the invention will appear from the following description taken together with the accompanying drawings.

BRIEF DESCRIPTION OF THE DRAWINGS

FIG. 2 is an exploded isometric view showing how the insert is made, FIG. 5 is a sectional view along line 5—5 in FIG. 3.

DETAILED DESCRIPTION OF THE INVENTION

Figure 1:
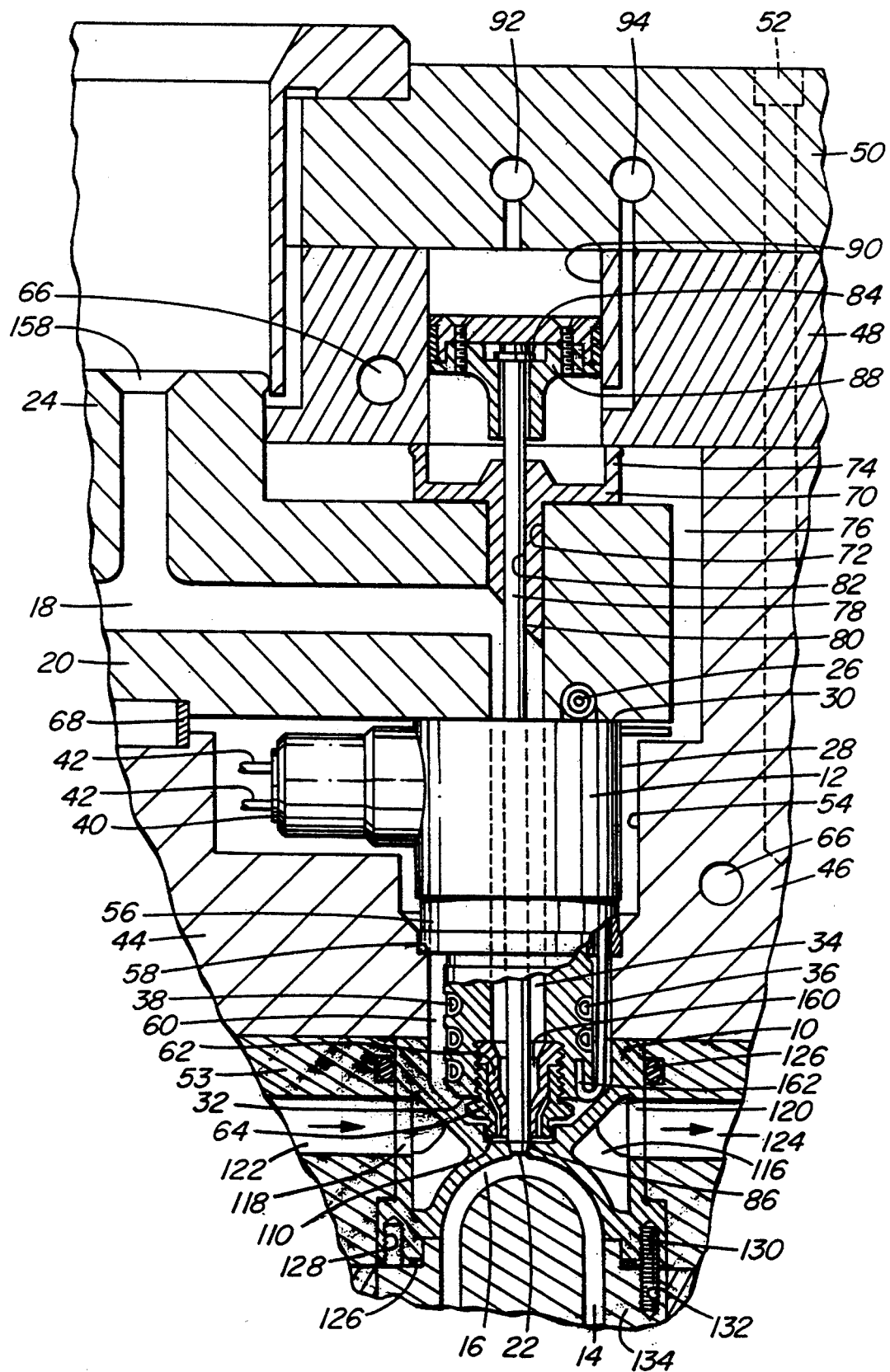
FIG. 1 is a sectional view of a portion of a multi-cavity injection molding system showing a gate and cavity insert according to a preferred embodiment of the invention.

Reference is first made to FIG. 1 which shows a portion of a multi-cavity valve gated injection molding system or apparatus having a gate and cavity insert 10 according to the invention mounted between a heated nozzle 12 and a cavity 14. The cavity 14 has a convex portion 16 which is partially formed by the gate and cavity insert 10 and in this embodiment is for molding PET preforms from which beverage bottles are made by stretch blow molding. A melt passage 18 branches in a steel melt distribution manifold 20 to the different steel nozzles 12 to convey pressurized melt to each gate 22 extending through the gate and cavity insert 10 to a respective cavity 14. The melt distribution manifold 20 has a cylindrical inlet portion 24 and is heated by an integral electrical heating element 26.

Each nozzle 12 has an outer surface 28, a rear end 30, a front end 32, and a central melt bore 34 extending from the rear end 30 to the front end 32. The nozzle 12 is heated by an integral electrical heating element 36 which has a spiral portion 38 extending around the melt bore 34 and an external terminal 40 to which electrical leads 42 from a power source are connected. While the mold 44 usually has a greater number of plates depending upon the application, in this case a manifold retainer plate 46, a cylinder plate 48 and a back plate 50 which are secured together by bolts 52, as well as a cavity retainer plate 53, are shown for ease of illustration. The nozzle 12 is seated in a generally cylindrical opening 54 in the manifold retainer plate 46 by a circular locating flange 56 which sits on a circular shoulder 58 in the opening 54 to accurately locate the nozzle 12 with its central bore 34 in alignment with the gate 22 extending through the insert 10 to the cavity 14. This provides an insulative air space 60 between the nozzle 12 and the surrounding manifold retainer plate 46 and the insert 10. In this configuration, a removable two-piece nozzle seal 62 is screwed into a threaded seat 64 in the front end 32 of the nozzle 12 to bridge the insulative air space 60 around the gate 22. The mold 44 is cooled by pumping cooling water through cooling conduits 66 extending in the manifold retainer plate 46 and cylinder plate 48. The distribution manifold 20 is mounted between the manifold retainer plate 46 and the cylinder plate 48 by a central locating ring 68 and valve sealing bushings 70. Each valve sealing bushing 70 is seated in an opening 72 through the manifold 20 in alignment with a nozzle 12 and has a flanged portion 74 which bears against the cylinder plate 48. Thus, another insulative air space 76 is provided between the heated manifold 20 and the surrounding cooled manifold retainer plate 46 and cylinder plate 48 to provide thermal separation between the heated manifold 20 and the surrounding cooled mold 44.

An elongated valve member 78 with a cylindrical outer surface 80 extends through a bore 82 in the valve sealing bushing 70 and centrally into the melt passage 18 and the aligned central melt bore 34 through the nozzle 12. The valve member 78 has an enlarged rear end 84 and a tapered tip 86 which is received in the gate 22 in the closed position. The rear end 84 of the valve member 78 is connected to pneumatic actuating mechanism which includes a piston 88 seated in a cylinder bore 90 in a cylinder plate 48. Controlled air pressure is applied to opposite sides of the piston 88 through air ducts 92, 94 extending through the back plate 50 to reciprocate the valve member 78 between a retracted open position and the forward closed position shown in which its tapered tip 86 is received in the gate 22 in the gate and cavity insert 10. While a pneumatic actuating mechanism is shown for ease of illustration, of course, hydraulic actuating mechanisms are used for many applications.

Figure 3:
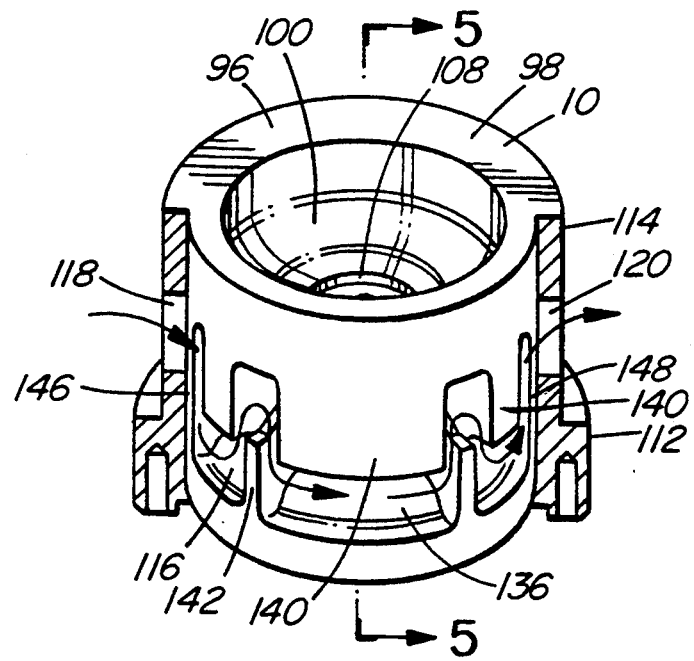
FIG. 3 is a partially cut-away view of the insert showing one of the flow passages for the cooling fluid.
Figure 4:
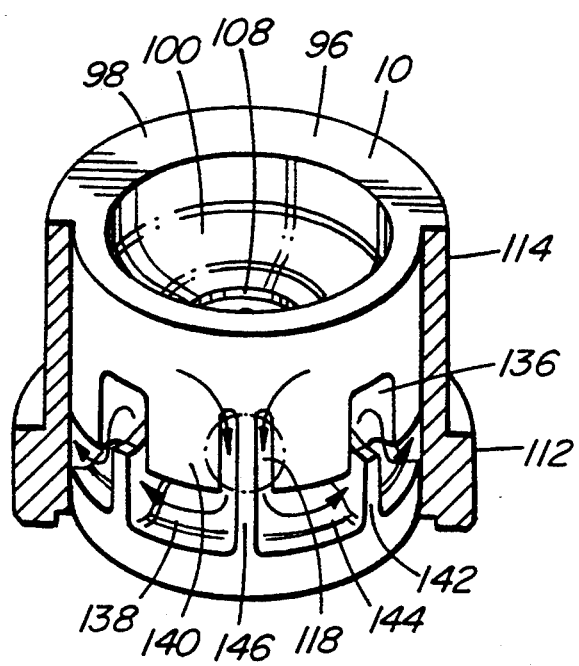
FIG. 4 is a similar view from a different angle showing a portion of both of the flow passages.

Referring also to FIGS. 3–5, the gate and cavity insert 10 according to the invention will now be described in detail. The gate and cavity insert 10 has a rear end 96 with a rear surface 98 having a recessed portion 100 and a front end 102 with a front surface 104 having a recessed portion 106 which partially forms the convex portion 16 of the cavity 14. The recessed portion 100 of the rear end 98 has a central seat 108 from which the tapered gate 22 extends to the cavity 14 and in which the front end 110 of the two-piece nozzle seal 62 is received. The gate and cavity insert 10 has an outer surface 112 with a generally cylindrical portion 114 extending from the rear end 96. The gate and cavity insert 10 has a cooling fluid chamber 116 which is generally circular except for the rib portions described below, and extends around the gate 22 from a cooling fluid inlet 118 to a cooling fluid outlet 120 which is opposite to the cooling fluid inlet 118. The cooling fluid inlet 118 and cooling fluid outlet 120 extend from the cylindrical portion 114 of the outer surface 112 of the gate and cavity insert 10 in alignment respectively with cooling fluid inlet and outlet conduits 122, 124 extending through the cavity retainer plate 53. Rubber O-rings 126 extend around the gate and cavity insert 10 to prevent leakage of the cooling fluid. The front end 102 of the gate and cavity insert 10 has several threaded holes 128 for removal of the insert 10, one of which receives an anti-rotation pin 130 which extends into a matching hole 132 in the cavity insert 134.

Reference is now made particularly to FIGS. 3 and 4 in describing how a pair of tortuous passages 136, 138 are formed for the cooling fluid flowing each way around the cooling fluid chamber 116 from the inlet 118 to the outlet 120. As can be seen, the gate and cavity insert 10 has a number of first radially extending rib portions 140 projecting frontwardly into the chamber 116 and a number of second radially extending rib portions 142 projecting rearwardly into the chamber 116. The frontwardly projecting rib portions 140 alternate with and are sufficiently spaced from the rearwardly projecting rib portions 142 to form the tortuous passages 136, 138 between them for the cooling fluid to flow around the insert 10 between the cooling fluid inlet 118 and outlet 120. In addition to providing more cooling because of turbulent flow of the cooling fluid around them and their increased surface area, these radially extending rib portions 136, 138 also substantially increase the strength of the insert 10 to withstand injection pressure in the cavity 14. As best seen in FIG. 5, this allows the cavity wall portion 144 between the cooling fluid passages 136, 138 and the cavity 14 to be made as thin as possible to withstand the injection pressure which further improves the cooling effect by the cooling fluid on the melt in the cavity 14. In this embodiment, the frontwardly extending rib portions 140 are much wider than the rearwardly extending rib portions 142 to extend the length of flow along the thin cavity wall portion 144 to optimize the combination of cooling and strength provided by the use of the rib portions 140, 142.

In this embodiment, a third thin rib portion 146 extends longitudinally across the cooling fluid chamber 116 in alignment with the cooling fluid inlet 118. Similarly, a fourth thin rib portion 148 extends longitudinally across the cooling fluid chamber 116 in alignment with the cooling fluid outlet 120. The third and fourth rib portions 146, 148 are substantially narrower in width than the diameter of the inlet 118 and outlet 120. In addition to dividing the flow of cooling fluid through the pair of tortuous passages 136, 138 opposite ways around the insert 10, these radially extending rib portions 146, 148 similarly provide the insert 10 with additional strength to withstand repeated injection pressure in the cavity 14. As can be seen, the section in FIG. 1 is slightly off center so that these rib portions 146, 148 are not seen in order to clarify how the cooling fluid flows in through the inlet 118 and out through the outlet 120.

Reference will now be made particularly to FIG. 2 in describing how the gate and cavity insert 10 according to the invention is made. First, an inner component 150 and an outer component 152 are machined of suitable materials to fit together. The outer component 152 is normally made of a suitable steel such as H13 or stainless steel and the inner component is preferably made of a beryllium-nickel alloy which is more conductive and corrosion resistant than steel. As can be seen, the inner component 150 has the rib portions 140, 142 extending frontwardly and rearwardly to form the tortuous cooling fluid passages 136, 138 therebetween, and also the third and fourth thin rib portions 146, 148. The outer component 152 has the cooling fluid inlet 118 extending therethrough opposite to the cooling fluid outlet 120. The inner component 150 is then inserted into the outer component 152 with the third rib portion 146 aligned with the cooling fluid inlet 118 and the fourth rib portion 148 aligned with the cooling fluid outlet 120. After being tack welded in this alignment, a nickel alloy paste is applied along the joints between them and they are gradually heated in a vacuum furnace to a temperature of approximately 1925° F. which is above the melting temperature of the nickel alloy. As the furnace is heated, it is evacuated to a relatively high vacuum to remove substantially all of the oxygen and then partially backfilled with an inert gas such as argon or nitrogen. When the melting point of the nickel alloy is reached, it melts and flows between the outer surface 154 of the inner component 150 and the inner surface 156 of the outer component 152. These surfaces 154, 156 are roughened or blasted with nickel shot and the nickel alloy spreads between them by capillary action to integrally braze the two components 150, 152 together to form the one-piece gate and cavity insert 10. Brazing them together this way in a vacuum furnace provides a metallurgical bonding of the nickel alloy to the steel to maximize the strength of the insert and prevent leakage of cooling water.

In use, the injection molding system is assembled as shown in FIG. 1. While only a single cavity 14 has been shown for ease of illustration, it will be appreciated that the melt distribution manifold 20 normally has many more melt passage branches extending to numerous cavities 14 depending on the application. Electrical power is applied to the heating element 26 in the manifold 20 and to the heating elements 36 in the nozzles 12 to heat them to a predetermined operating temperature. Water or other suitable cooling fluid at predetermined temperatures is supplied to the cooling conduits 66 and 122 to cool the mold 44 and the gate and cavity insert 10. Hot pressurized melt is then injected from a molding machine (not shown) into the melt passage 18 through the central inlet 158 according to a predetermined cycle in a conventional manner. The melt passage branches outward in the manifold 20 to each nozzle 12 where it extends through the central bore 34 and then through the aligned opening 160 in the two-piece seal 62 to the respective gate 22. In this embodiment, controlled pneumatic pressure is applied to the cylinders 90 through air ducts 92, 94 to control actuation of the pistons 88 and valve members 78 according to a predetermined cycle in a conventional manner. When the valve members 78 are in the retracted open position, the pressurized melt flows through the melt passage 18 and the gates 22 until the cavities 14 are full. When the cavities 14 are full, injection pressure is held momentarily to pack. The pneumatic pressure is then reversed to reciprocate the valve members 78 to the forward closed position in which the tip 86 of each of the valve members 78 is seated in one of the gates 22. The injection pressure is then released and, after a short cooling period, the mold 44 is opened for ejection. After ejection, the mold 44 is closed, pneumatic pressure is applied to retract the valve members 78 to the open position and melt injection pressure is reapplied to refill the cavities 14. This cycle is repeated continuously with a frequency depending upon the number and size of the cavities and the type of material being molded. The operating temperature is monitored by a thermocouple element 162 which extends into the front end 32 of the nozzle 12.

While the description of the injection molding apparatus according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding one-piece gate and cavity insert to be mounted in a mold between a heated nozzle and the cavity, the gate and cavity insert having a rear surface with a recessed portion, a front surface which partially forms a cavity, and a gate extending centrally therethrough from the rear surface to the front surface to convey melt from the nozzle to the cavity, the gate and cavity insert having an outer surface, a cooling fluid inlet, a cooling fluid outlet, and a circular cooling fluid chamber, the outer surface of the gate and cavity insert having a generally cylindrical portion with the cooling fluid inlet and the cooling fluid outlet extending inwardly therefrom opposite to each other, the generally circular cooling fluid chamber extending in the gate and cavity insert to convey cooling fluid from the cooling fluid inlet both ways around the gate to the cooling fluid outlet, the improvement wherein;

the front surface of the gate and cavity insert has a recessed portion to partially form a convex portion of the cavity, the gate and cavity insert having a cavity wall portion with a predetermined thickness extending between the cooling fluid chamber and the cavity, the gate and cavity insert having a plurality of first radially extending rib portions projecting frontwardly into the cooling fluid chamber, and a plurality of second radially extending rib portions projecting rearwardly from the cavity wall portion into the cooling fluid chamber, the first frontwardly extending rib portions alternating with and being sufficiently spaced from the second rearwardly extending rib portions to provide a pair of tortuous passages through the cooling fluid chamber for the cooling fluid flowing from the cooling fluid inlet to the cooling fluid outlet.

2. In a gate and cavity insert as claimed in claim 1 wherein the first frontwardly extending rib portions are substantially wider than the second rearwardly extending rib portions to provide an optimum combination of flow of cooling fluid adjacent the cavity wall portion and structural strength from the first and second ribs.

3. In a gate and cavity insert as claimed in claim 2 wherein a third thin rib portion having a predetermined width extends longitudinally across the cooling fluid chamber in alignment with the cooling fluid inlet extending inwardly from the outer surface of the gate and cavity insert, the cooling fluid inlet being of a diameter substantially greater than the width of the third rib portion, whereby cooling fluid flowing inwardly through the cooling fluid inlet divides at the third rib portion and flows both ways through the tortuous passages around the gate.

4. In a gate and cavity insert as claimed in claim 3 wherein a fourth thin rib portion having a predetermined width extends longitudinally across the cooling fluid chamber in alignment with the cooling fluid outlet extending inwardly from the outer surface of gate and cavity insert, the cooling fluid outlet being of a diameter substantially greater than the width of the fourth rib portion, whereby the cooling fluid flowing both ways through the tortuous passages combine past the fourth rib portion and flow outwardly through the cooling fluid outlet.

5. In a gate and cavity insert as claimed in claim 4 wherein the gate and cavity insert has an inner component and an outer component, the inner component being made of a beryllium-nickel alloy and the outer component being made of steel.

* * * * *